(12) United States Patent
McElmeel, Jr. et al.

(10) Patent No.: US 6,520,274 B1
(45) Date of Patent: Feb. 18, 2003

(54) MODULAR ELECTRIC STEERING GEAR ASSEMBLY

(75) Inventors: Edward Francis McElmeel, Jr., Milan, MI (US); Ian Yiying Hwa, West Bloomfield, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/558,024

(22) Filed: Apr. 25, 2000

(Under 37 CFR 1.47)

(51) Int. Cl.[7] .................................................. B62D 5/04
(52) U.S. Cl. ....................................... 180/144; 180/143
(58) Field of Search .................................. 180/443, 444

(56) References Cited

U.S. PATENT DOCUMENTS

| | | | | |
|---|---|---|---|---|
| 5,717,590 A | * | 2/1998 | Mihalko | 364/424.051 |
| 5,819,871 A | * | 10/1998 | Takaoka | 180/444 |
| 5,948,030 A | * | 9/1999 | Miller et al. | 701/41 |
| 5,971,094 A | * | 10/1999 | Joshita | 180/444 |
| 6,000,491 A | * | 12/1999 | Shimizu et al. | 180/444 |

* cited by examiner

*Primary Examiner*—Paul N. Dickson
*Assistant Examiner*—L. Lum

(57) ABSTRACT

A modular pinion gear housing subassembly and method for making same, wherein the modular concept allows for testing and calibration of critical steering gear components prior to final assembly onto a electrically assisted rack and pinion power steering assembly, increases packaging efficiency, and increases potential for commonality of parts between vehicle platforms. The modular pinion gear housing subassembly comprises as its main components a pinion shaft having an input portion and an output portion, a pinion gear, a gear mechanically coupled to the pinion shaft, and a torque sensor coupled to the pinion shaft. The modular pinion gear housing subassembly is substantially contained within a pinion housing, with the input portion and the pinion gear extending from the housing and available to be coupled with other power steering components.

13 Claims, 5 Drawing Sheets

MODULAR ELECTRIC STEERING GEAR ASSEMBLY

TECHNICAL FIELD

The present invention relates to the power steering systems and more specifically to modular electric steering gear subassembly design.

BACKGROUND

Over the years, power steering has become standard equipment on most vehicles. Most late model passenger cars with power steering use either a power rack and pinion system or an integral power steering gear assembly. Most front wheel drive cars use power rack and pinion systems, while most rear wheel drive systems use an integral power steering gear. Power steering systems are typically either hydraulic-based systems, where fluid pressure is used to aid the steering assembly in turning a vehicle, or electric-based systems, where an electric motor is coupled to the steering assembly to aid the steering assembly in turning the vehicle.

Automobile power steering is actually power-assisted steering. All systems are constructed so that the car can be steered manually when the engine is not running or if the steering system is disconnected from the power source.

One problem common to both hydraulic-based and electric-based power steering systems is that the systems typically must be assembled completely before they can be tested. If a problem in the initial assembly is detected or if the overall system is not functioning properly, the system must be disassembled to determine the root cause of the problem and then be reassembled to test the replaced component. This disassemble/reassemble process is time consuming and costly.

Another problem with typical power steering assemblies is that they are extremely bulky to ship when fully assembled. This bulkiness increases costs associated with packaging efficiency.

Another problem with typical power steering assemblies is commonality. Commonality is highly desirable in automotive assembly plants or other industries, in that individual sub-assemblies may be used on more than one platform. The more commonality among parts, the more efficient the process to make vehicles, and the more cost savings that can be achieved.

SUMMARY OF THE INVENTION

It would therefore be desirable to provide a modular power steering assembly that is capable of being tested at various stages prior to final assembly on a vehicle to ensure that various components are functioning properly. It is also desirable that these assemblies are capable of being shipped as subassembly components for efficiency and cost reasons. The modular concept is also highly desirable in that it increases the potential for commonality between vehicle platforms.

The modular design concept has great advantages over typical power steering assemblies. First, it allows the testing and calibration of critical steering gear components independently prior to final assembly.

Next, the modular design concept provides increased packaging flexibility in two ways. First individual sub-assemblies may be shipped independently of other components. Second, shipping costs can be minimized by increasing the usable space in a container by packaging the subassemblies prior to final assembly in a more efficient and space conscious manner, not as a bulky final assembly.

Third, the modular design concept can increase component/subassembly commonality across vehicle platforms, which can lead to tremendous cost savings.

Other objects and advantages of the present invention will become apparent upon considering the following detailed description and appended claims, and upon reference to the accompanying drawings.

DESCRIPTION OF THE PREFERRED EMBODIMENT(S)

Figure 1:
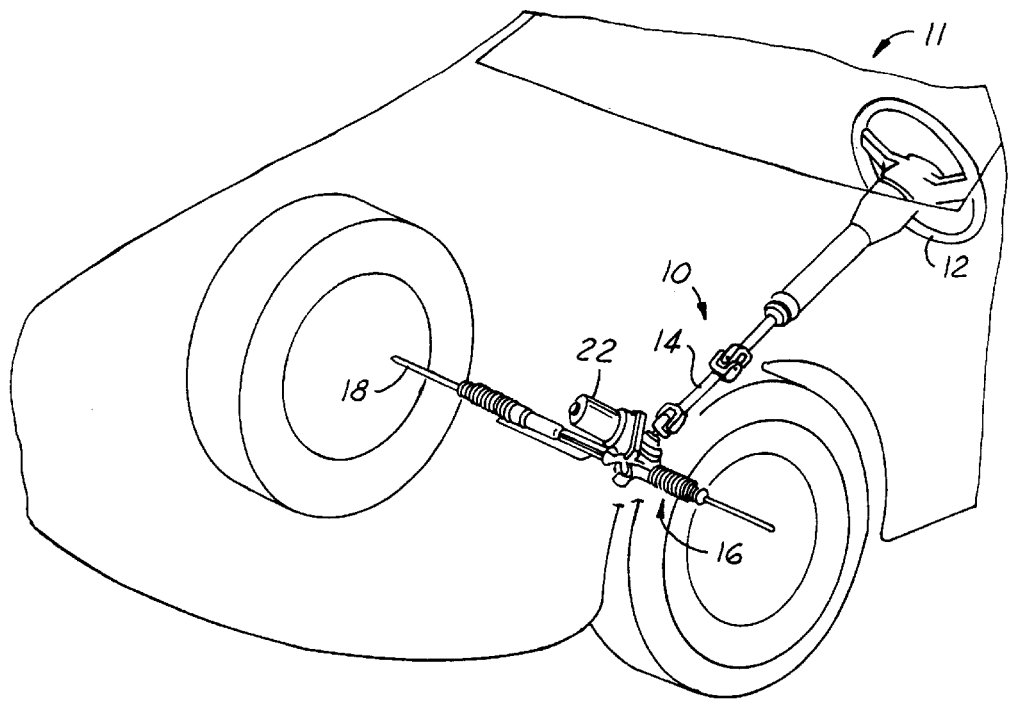
FIG. 1 is a perspective view of a electrically powered rack and pinion power steering assembly having a pinion gear housing subassembly according to a preferred embodiment of the present invention.

Referring to FIG. 1, an electrically powered rack and pinion power steering assembly 10 of a vehicle 11 having a modular pinion gear housing subassembly 16 according to a preferred embodiment is shown. The assembly 10 also has as its major components a steering wheel 12 connected to a steering shaft 14 that cooperates with the modular pinion gear housing subassembly 16; a rack (not shown) cooperating with another portion of the modular pinion gear housing subassembly 16; a pair of tie rods 18 cooperating with a and the tires 20 which cooperate with tie rods 18. An electric motor 22 is coupled to the modular pinion gear housing subassembly 16 and is used to assist the assembly 10 in turning the vehicle 11.

Figure 3:
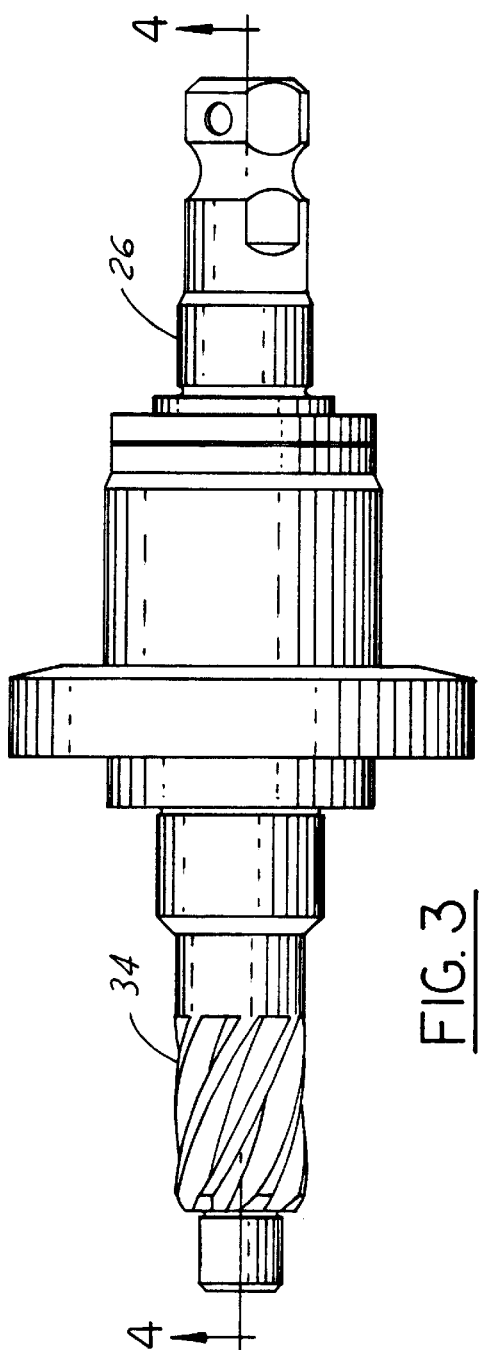
FIG. 3 is a perspective view of the pinion gear housing subassembly of FIG. 2.
Figure 4:
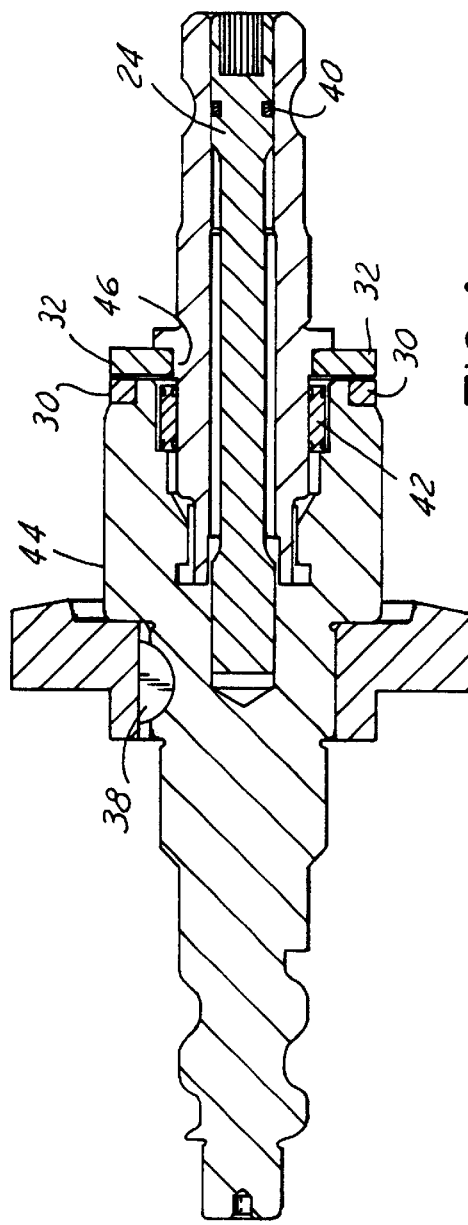
FIG. 4 is a cross-sectional view of the pinion gear housing subassembly of FIG. 3 taken through line 4—4.

FIGS. 3 and 4 show a perspective view and a cross-sectional view of one embodiment of the modular pinion gear housing subassembly 16 according to the present invention, wherein the modular pinion gear housing subassembly 16 has as its major components a torsion bar 24 contained within an input portion 26 of the pinion shaft 27, a portion of an optical torque sensor 28 (fully shown in FIG. 5 below) having a lower sensor disk 30 and a upper sensor disk 32, and a pinion gear 34. The lower sensor disk 32 has a first outer diameter having a first bar code sequence thereon. The upper sensor disk 32 has a second outer diameter having a second bar code sequence thereon. When the steering wheel 12 turns, the torsion bar 24 twists in response to this turning. This causes relative movement of the lower sensor disk 30 to the upper sensor disk 32, and the optical pickup (not shown) of the sensor 28 picks up this movement by reading sections of the bar codes in a method well known in the art.

A torsion bar o-ring 40 seals the torsion bar 24 within the input portion 26. A torque sensor support needle 42 is pressed on the input portion 26. A gear 38 coupled from the electric motor 22 is coupled to the output portion 44 of the pinion shaft 27. The gear 38 is preferably a hypoid shaped gear.

Figure 2:
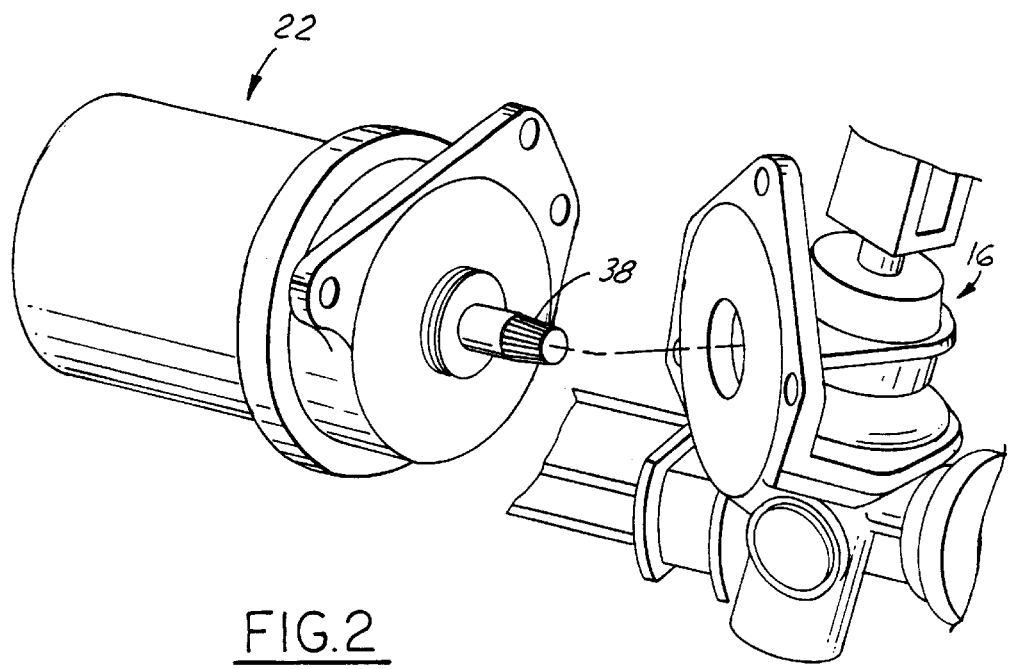
FIG. 2 is a perspective view of a pinion gear housing subassembly uncoupled from an electric motor according to a preferred embodiment of the present invention.
Figure 6:
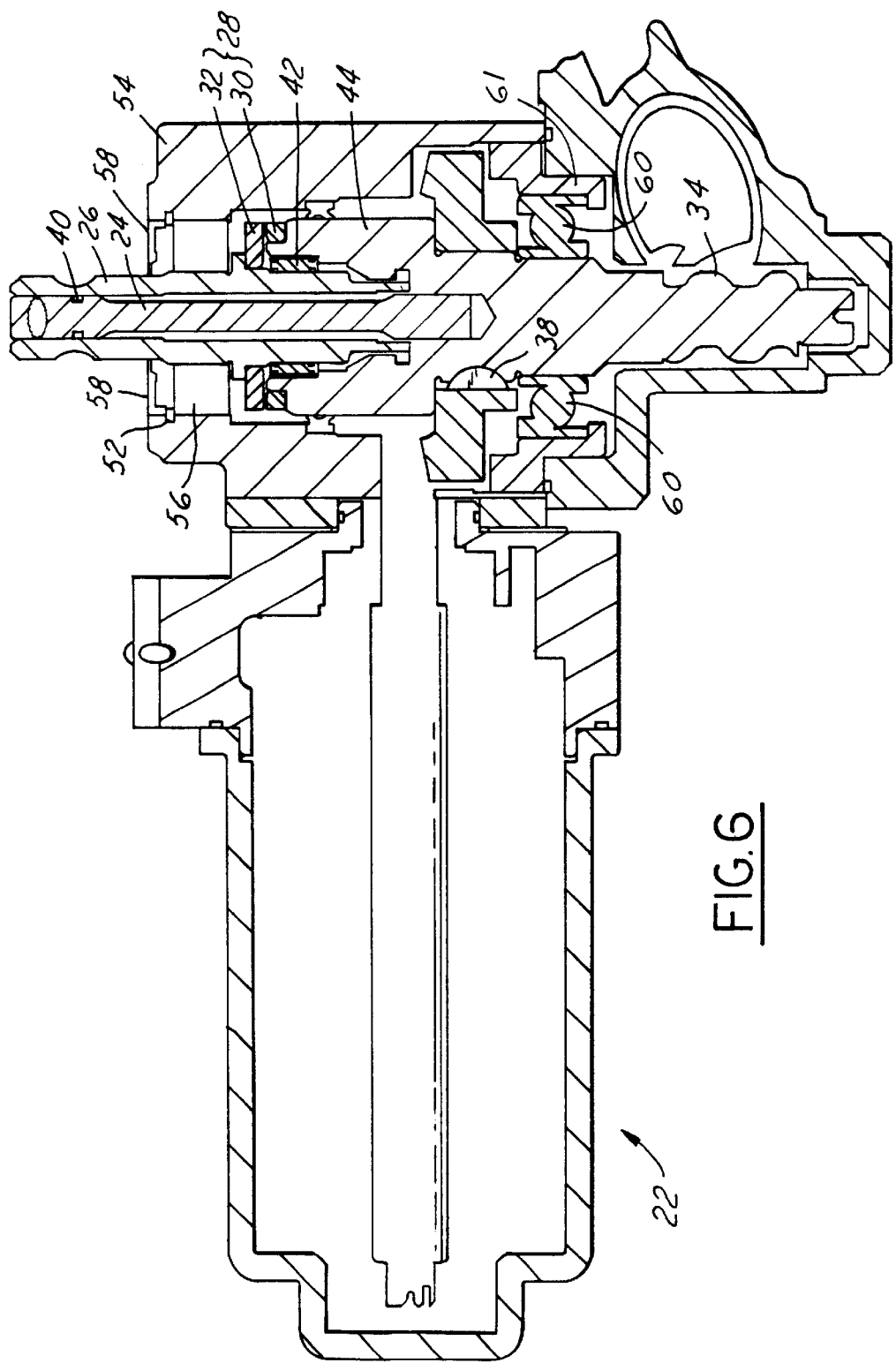
FIG. 6 is a cross-sectional view where the pinion gear housing subassembly is further assembled with an electric motor and a rack.

FIG. 6 shows the same cross-sectional view of the present invention of FIG. 4, wherein the electric motor 22 and rack 36 are also shown and the modular pinion gear housing assembly 16 is substantially contained within a pinion housing 54. FIG. 2 shows the electric motor 22 prior to assembly on the modular pinion gear housing subassembly 16.

Figure 5:
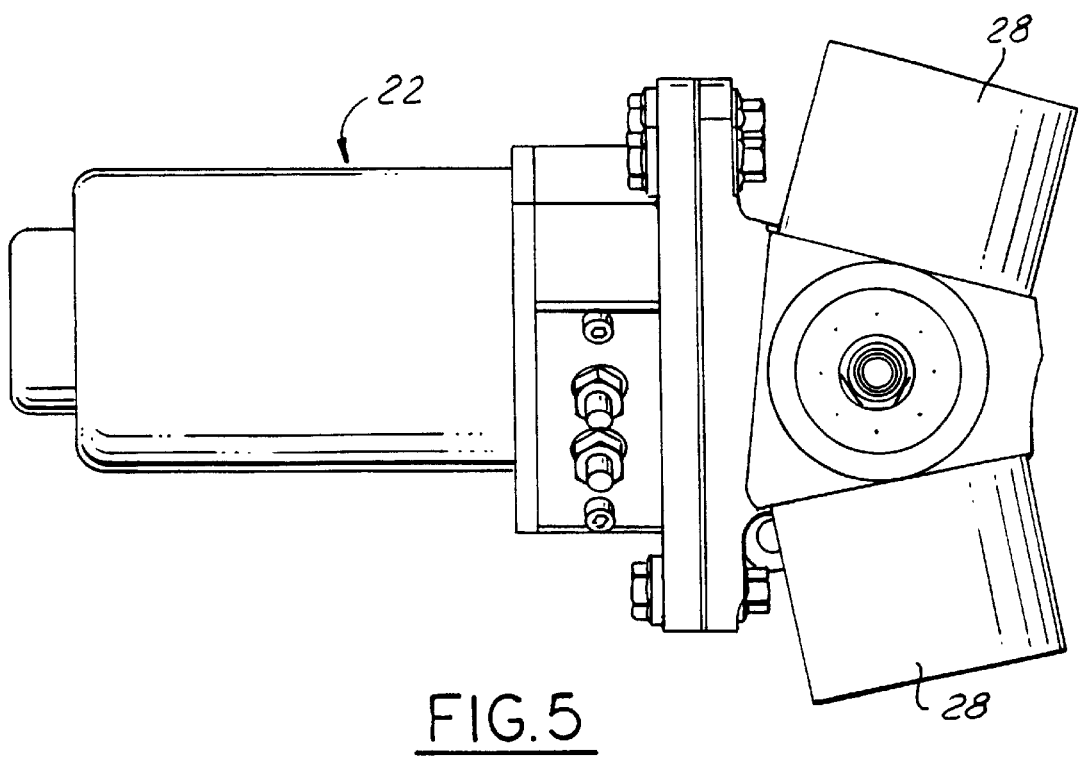

Referring now to FIGS. 4 and 5, the modular pinion gear housing subassembly 16 is shown substantially within the pinion housing 54, where the pinion gear 34 is coupled to the rack 36. FIGS. 4 and 5 also show the electric motor 22 coupled to and uncoupled from the modular pinion gear subassembly.

The electric motor 22 is coupled to the subassembly 16 by pressing the gear 38 onto the output portion 44. The pinion housing 54 contains a snap ring 52 installed thereon. The pinion housing 54 further contains an upper angular contact bearing 56, a sensor dust seal 58, and a lower angular contact bearing 60. The upper angular contact bearing 56 and the sensor dust seal 58 are pressed onto the pinion housing 54. The lower angular contact bearing 60 is pressed into a threaded housing 61. The angular contact bearings 56, 60 function to rotatably support the gear housing subassembly 16 within the pinion housing 54. The pinion housing 54 substantially contains most of the modular pinion gear housing subassembly 16, with a portion of input portion 26 and pinion gear 34 not contained within the pinion housing 54.

To assemble the modular pinion gear housing subassembly 16 according to this preferred embodiment, each subassembly of the modular pinion gear housing subassembly 16 must first be completed. To assemble the pinion subassembly 90, first the gear 38 is pressed onto the output portion 44. Next, the torsion bar 24 is pressed into the output portion 44 and pinned to the input portion 26, completing the pinion subassembly 90.

The optical torque sensor subassembly 92 is then assembled by first installing the torsion bar o-ring 40. Second, the torque sensor support needle bearing 42 is pressed into the input portion 26. Third, the lower sensor disk 30 of the optical torque sensor 28 is pressed onto the input portion 26 and the upper sensor disk 32 of the optical torque sensor 28 is pressed onto the shoulder 46 of the output portion 44. Fifth, the output portion 44 is slid over the torsion bar 24 and into the input portion 26. Sixth, the output portion 44 is drilled and pinned to the torsion bar 24. Finally, a laser bar code is etched on the outer diameters of the lower sensor disk 30 and the upper sensor disk 32 to complete the torque sensor sub-assembly 92.

Next, the pinion housing subassembly 94 is assembled. First, a snap ring 52 is installed on the pinion housing 54. Next, the upper angular contact bearing 56 is pressed onto the pinion housing 54. Finally, a sensor dust seal 58 is pressed into the pinion housing 54 to complete the pinion housing subassembly 94.

Pressing the lower angular contact bearing 60 into the threaded housing 61 then completes the bearing housing subassembly 96.

The pinion subassembly 90 and torque sensor subassembly 92 is then installed into the pinion housing subassembly 94, and the bearing housing subassembly 96 in then installed into the pinion housing 54 and torqued to take out play in the angular contact bearings 56, 60. The modular pinion gear housing assembly 16 may then be bolted onto a motor assembly (not shown) to complete torque sensor evaluation and motor module evaluation prior to final gear assembly.

Having the capability of evaluating torque sensors and motor modules prior to final assembly is of potentially great advantage in that it may limit the time and cost necessary to disassemble and replace non-working or out of specification components.

In operation, an operator uses the steering wheel 12 to rotate the steering shaft 14. The steering shaft 14 in turn twists the torsion bar 24 and rotates the pinion gear 34. The pinion gear 34 in turn acts on the rack 36, causing it to slide sideways within the gear housing subassembly (not shown). As the rack 36 moves sideways, it either pushes or pulls the tie rods 18, which in turn rotates the steering knuckles (not shown) and front tires 20.

Also, when the steering wheel 12 is turned, the weight of the vehicle 11 causes the front tires 20 to resist turning. This twists the torsion bar 24, causing a relative angular displacement between the lower sensor disk 30 and the upper sensor disk 32 of the optical torque sensor 28, which exposes a different sequence of bar codes on the outer diameters which are read by sensing equipment (not shown) within the sensor 28. The sensing equipment is coupled to a microprocessor based engine control module (not shown), which is coupled to the electric motor 22. The engine control module processes the sequence of bar codes and other vehicle parameters, such as engine speed, to determine the proper amount of power assist for the particular driving condition. The electronic control module then sends a signal to instruct the electric motor 22 how much assist to provide. Because the output portion 44 is connected at one end to the torsion bar 24 and the input portion 26 to the other, the assist torque delivered by the electric motor 22 to the output portion 44 reduces the steering effort perceived by the driver while exerting the necessary force on the rack 36 through the coupled rack 36 and pinion gear 34 to steer the vehicle 11.

In another preferred embodiment of the present invention in contrast to FIGS. 2–6 wherein one optical sensor 28 is used, a plurality of optical torque sensors may be used to further verify the change in bar code sequence. A plurality of optical sensors 28 provides a redundant system that is desirable in many automotive applications. As illustrated, the torque sensors 28 are in separate housings, however, they could also be contained within one housing.

Figure 7:
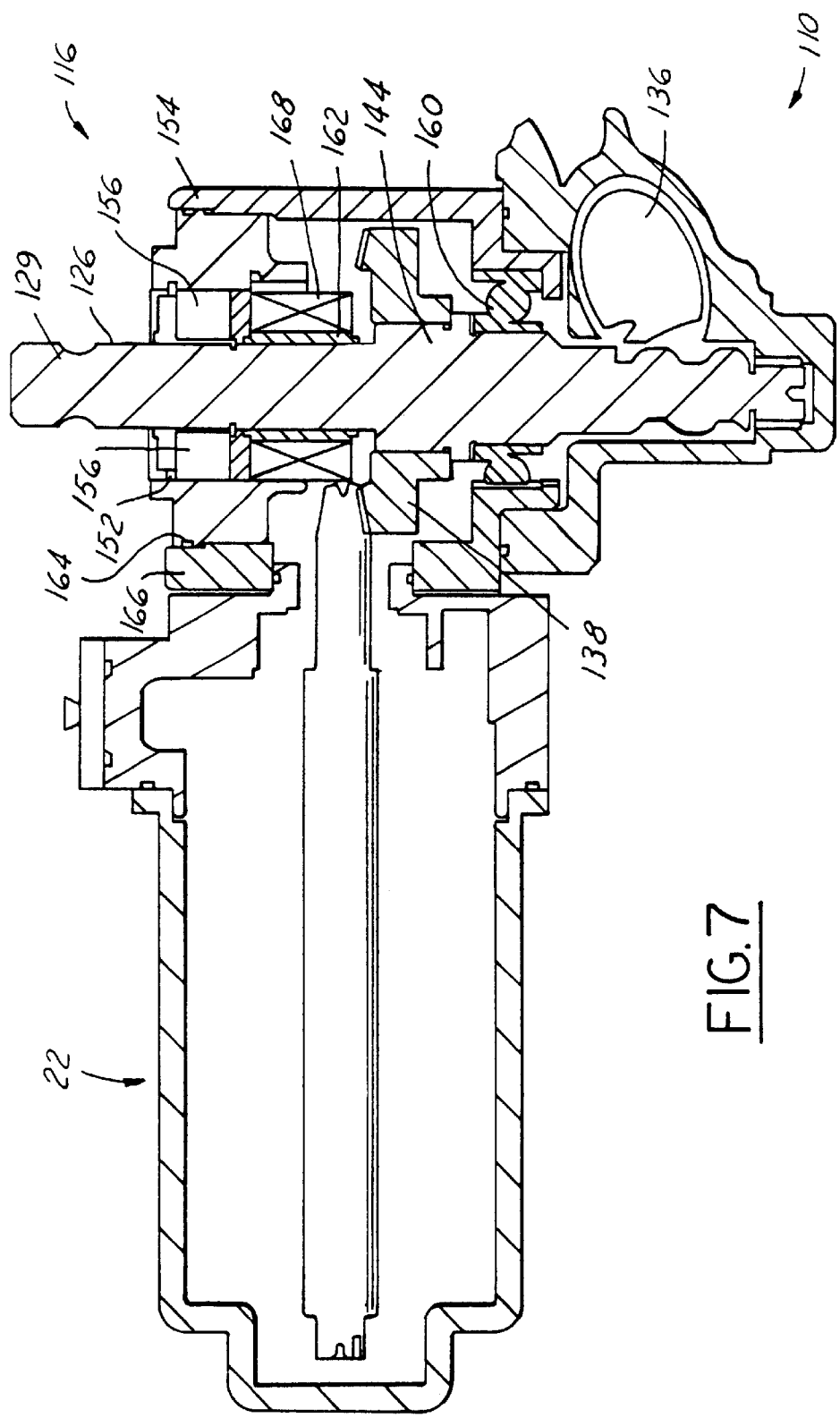
FIG. 7 is a cross-sectional perspective view another preferred embodiment of the present invention.

Referring now to FIG. 7, another embodiment of the modular pinion gear housing subassembly 116 is disclosed coupled to the electric motor 22 and the rack 136. In this embodiment, the optical torque sensor 28 is replaced by a magnetoelectric sensor 168.

The modular pinion gear housing subassembly 116 has as its major components pinion shaft 127 having an input portion 126, a magnetoelectric sensor 168 containing torque-sensing coils 170, and a pinion gear 134. A gear 138 from the electric motor 22 is coupled to the pinion shaft 127. The gear 138 is preferably hypoid shaped. It is contemplated that a torsion bar (not shown) may be added to the subassembly 116 for damping or compliance reasons.

The modular pinion gear housing subassembly 116 is shown substantially within the pinion housing 154, wherein the input portion 126 and pinion gear 154 are not enclosed within the housing. The assembly 116 in FIG. 7 is coupled to the electric motor 22 and the rack 136. The pinion housing 154 contains a snap ring 152 installed on the pinion housing 154. The pinion housing further contains an upper angular contact bearing 156, a sensor dust seal 158, and a lower angular contact bearing 160, all of which are pressed onto the pinion housing 154. The angular contact bearings 156, 160 function to rotatably support the gear housing subassembly 116 within the pinion housing 154.

To assemble the modular pinion gear housing subassembly 116 according to this preferred embodiment, each subassembly of the modular pinion gear housing subassembly 116 must first be completed. To assemble the pinion shaft subassembly 190, first the gear 138 is pressed onto the pinion shaft 126. Next, the magnetoelectric sensor ring 162 is pressed onto the pinion shaft 126. Magnetic field conditioning is then performed, in which the magnetoelectric sensor 168 is calibrated. Next, the snap ring 152 is installed to complete the pinion shaft subassembly.

Pressing the lower angular contact bearing 160 into the pinion housing 154 then completes the pinion housing subassembly 192.

Next, the threaded housing subassembly is assembled by first installing a snap ring 164 into a threaded housing 166 and then pressing the upper angular contact bearing 156 into the threaded housing 166. A donut-shaped magnetoelastic torque sensor 168 containing torque-sensing coils 170 is then pressed into the threaded housing 166 to complete the threaded housing subassembly 194.

The pinion shaft subassembly 190 is then installed into the pinion housing subassembly 192, followed by the threaded housing assembly 194, which is then torqued to take out play in the angular contact bearings 156, 160. The completed modular pinion gear housing subassembly 116 may then bolted onto a motor assembly (not shown) to complete torque sensor evaluation and motor module evaluation prior to final gear assembly. Having the capability of evaluating torque sensors and motor modules prior to final assembly is of potentially great advantage in that it may limit the time and cost necessary to disassemble and replace non-working or out of specification components.

In operation, an operator uses the steering wheel 12 to rotate the steering shaft 14. The steering shaft acts on the pinion shaft 126, which in turn rotates the pinion gear 134. The pinion gear 134 in turn acts on the rack 136, causing it to move sideways within the gear housing (not shown). As the rack 136 moves sideways, it either pushes or pulls the tie rods 18, which in turn rotates the steering knuckles (not shown) and front tires 20.

Also, when the steering wheel 12 is turned, the weight of the vehicle 11 causes the front tires 20 to resist turning. This strains the magnetoelastic material of the pinion shaft 126, which causes the magnetic field to change within the threaded housing. This change in magnetic field acts on the torque-sensing coils 170, which are read by the sensing equipment (not shown) inside the sensor 168. The sensing equipment is coupled to a microprocessor based engine control module (not shown), which is coupled to the electric motor 22. The engine control module processes the sequence of magnetic changes and other vehicle parameters, such as engine speed, to determine the proper amount of power assist for the particular driving condition. The electronic control module then sends a signal to instruct the electric motor 22 how much assist to provide. Because the output portion 144 is connected at one end to the torsion bar 124 and the input shaft 134 to the other, the assist torque delivered by the electric motor 22 to the output port ion 144 reduces the steering effort perceived by the driver while exerting the necessary force on the rack 136 through the rack 136 and pinion gear 134 set to steer the vehicle 11.

While the invention has been described in terms of preferred embodiments, it will be understood, of course, that the invention is not limited thereto since modifications may be made by those skilled in the art, particularly in light of the foregoing teachings.

What is claimed is:

1. A method of assembling a modular pinion gear housing subassembly for use in an electrically assisted power steering system, the method comprising:

forming a pinion subassembly;

forming a torque sensor subassembly, said torque sensor subassembly comprising a torque sensor;

forming a pinion housing subassembly;

pressing a lower contact bearing into a threaded housing to form a bearing housing subassembly;

installing said pinion subassembly within said pinion housing subassembly;

installing said torque sensor subassembly within said pinion housing subassembly; and installing said bearing housing subassembly into a pinion housing of said pinion housing subassembly.

2. The method according to claim 1 further comprising testing said torque sensor prior to final assembly into the electrically assisted power steering system.

3. The method according to claim 1 further comprising testing said torque sensor and an electric motor of said pinion subassembly prior to final assembly into the electrically assisted power steering system.

4. The method according to claim 1, wherein forming a pinion subassembly comprises:

pressing a gear of an electric motor onto an output portion of a pinion shaft; and pressing a torsion bar onto said output portion of said pinion shaft.

5. The assembly of claim 1, wherein forming a torque sensor subassembly comprises:

installing a torsion bar o-ring;

pressing a torque sensor support needle bearing into an input portion of a pinion shaft;

pressing a lower sensor disk of an optical torque sensor into said input portion;

pressing an upper sensor disk onto a shoulder of an output portion of said pinion shaft;

sliding said output portion over a torsion bar and into said input portion; and drilling and pinning said output portion to said torsion bar.

6. The assembly of claim 1, wherein forming a pinion housing subassembly comprises:

installing a snap ring on a pinion housing;

pressing an upper angular contact bearing onto said pinion housing; and pressing a sensor dust seal into said pinion housing.

7. A modular pinion gear housing subassembly for use in an electrically assisted power steering system having a rack, the assembly comprising:

a pinion housing subassembly;

a torque sensor subassembly coupled within said pinion housing subassembly, said torque sensor subassembly comprising a torque sensor, a torsion bar o-ring, and a torque sensor support needle bearing;

a pinion subassembly coupled within said pinion housing subassembly; and a bearing housing subassembly coupled within said pinion housing subassembly, wherein said torque sensor is capable of being tested prior to final assembly on the electrically assisted power steering system.

8. The assembly of claim 7, wherein said pinion subassembly comprises:

a pinion shaft;

an electric motor coupled to an output portion of said pinion shaft; and a torsion bar coupled to said output portion, wherein said electric motor is capable of being tested prior to final assembly on the electrically assisted power steering system.

9. A modular pinion gear housing subassembly for use in an electrically assisted power steering system having a rack, the assembly comprising:

a pinion housing subassembly, wherein said pinion housing subassembly comprises a pinion housing, a snap ring coupled to said pinion housing, an upper angular contact bearing pressed onto said pinion housing, and a sensor dust seal pressed into said pinion housing;

a torque sensor subassembly coupled within said pinion housing subassembly, said torque sensor subassembly comprising a torque sensor;

a pinion subassembly coupled within said pinion housing subassembly; and, a bearing housing subassembly coupled within said pinion housing subassembly, wherein said torque sensor is capable of being tested prior to final assembly on the electrically assisted power steering system.

10. A modular pinion gear housing subassembly for use in an electrically assisted power steering system having a rack, the assembly comprising:

a pinion housing subassembly;

a torque sensor subassembly coupled within said pinion housing subassembly, said torque sensor subassembly comprising a torque sensor;

a pinion subassembly coupled within said pinion housing subassembly; and a bearing housing subassembly coupled within said pinion housing subassembly comprising a threaded housing and a lower angular contact bearing pressed into said treaded housing, wherein said torque sensor is capable of being tested prior to final assembly on the electrically assisted power steering system.

11. A modular pinion gear housing subassembly for use in an electrically assisted power steering system having a rack, the assembly comprising:

a pinion housing subassembly;

a pinion shaft subassembly coupled into said pinion housing subassembly; and a threaded housing subassembly coupled into said pinion housing subassembly, said threaded housing subassembly comprising a magnetoelectric torque sensor comprising at least one torque sensing coil, said threaded housing subassembly further comprising a threaded housing, a snap ring coupled to said threaded housing, and an upper angular contact bearing coupled to said threaded housing;

wherein said magnetoelectric torque sensor is capable of being tested prior to final assembly on the electrically assisted power steering system.

12. The assembly of claim 11, wherein said pinion shaft subassembly comprises:

a pinion shaft;

an electric motor coupled to said pinion shaft;

a magnetoelectric sensor ring coupled to said pinion shaft; and a snap ring coupled to said pinion shaft.

13. The assembly of claim 11, wherein said pinion housing subassembly comprises:

a lower control bearing; and a pinion housing coupled to said lower control bearing.

* * * * *